United States Patent
Zha et al.

(10) Patent No.: US 11,949,356 B2
(45) Date of Patent: Apr. 2, 2024

(54) MOTOR VIBRATION CONTROL METHOD AND ELECTRONIC DEVICE

(71) Applicant: HUAWEI TECHNOLOGIES CO., LTD., Shenzhen (CN)

(72) Inventors: Tingmin Zha, Shanghai (CN); Bowen Chen, Shanghai (CN); Chunjiang Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/761,721

(22) PCT Filed: Sep. 1, 2020

(86) PCT No.: PCT/CN2020/112884
§ 371 (c)(1),
(2) Date: Mar. 18, 2022

(87) PCT Pub. No.: WO2021/052170
PCT Pub. Date: Mar. 25, 2021

(65) Prior Publication Data
US 2022/0416706 A1 Dec. 29, 2022

(30) Foreign Application Priority Data
Sep. 18, 2019 (CN) .......................... 201910883245.6

(51) Int. Cl.
*H02P 25/032* (2016.01)
*H02P 23/14* (2006.01)
(Continued)

(52) U.S. Cl.
CPC ............ *H02P 25/032* (2016.02); *H02P 23/14* (2013.01); *G08B 6/00* (2013.01); *H02J 7/0047* (2013.01); *H02J 7/0063* (2013.01)

(58) Field of Classification Search
CPC ......... H02P 25/032; H02P 23/14; G08B 6/00; H02J 7/0047; H02J 7/0063
(Continued)

(56) References Cited

U.S. PATENT DOCUMENTS 9,045,033 B2 * 6/2015 Kinoshita ............. B60W 10/08
2008/0113693 A1 5/2008 Yoo
(Continued)

FOREIGN PATENT DOCUMENTS

CN 1305616 A 7/2001
CN 101222713 A 7/2008
(Continued)

OTHER PUBLICATIONS

Kataoka et al. (FR 2909054 A1) On-Board Control Device Powered by an Embedded Battery (Year: 2008).*
(Continued)

*Primary Examiner* — Jorge L Carrasquillo
(74) *Attorney, Agent, or Firm* — Maier & Maier, PLLC

(57) ABSTRACT

A motor vibration control method and an electronic device can implement vibration of a motor when a loading capability of a battery is low. A battery status is obtained when a first motor vibration waveform vibration request is received. The battery status includes a battery temperature, a battery temperature and a battery level, or a battery power supply capability. A motor vibration parameter is switched if the battery status meets a preset condition, where the preset condition is that the battery power supply capability is lower than a first threshold, the battery temperature is lower than a second threshold, or the battery temperature and the battery level are lower than a third threshold array. The motor vibration parameter includes a motor vibration waveform or a motor vibration input voltage. The motor is driven to vibrate based on a switched motor vibration parameter.

20 Claims, 4 Drawing Sheets

(51) Int. Cl.
*G08B 6/00* (2006.01)
*H02J 7/00* (2006.01)

(58) Field of Classification Search
USPC .......................................................... 318/114
See application file for complete search history.

(56) References Cited

U.S. PATENT DOCUMENTS

| | | |
|---|---|---|
| 2012/0166112 A1 | 6/2012 | Wang et al. |
| 2015/0005038 A1 | 1/2015 | Cai et al. |

FOREIGN PATENT DOCUMENTS

| | | |
|---|---|---|
| CN | 101516736 A | 8/2009 |
| CN | 101534744 A | 9/2009 |
| CN | 101645979 A | 2/2010 |
| CN | 102538947 A | 7/2012 |
| CN | 102724340 A | 10/2012 |
| CN | 105416272 A | 3/2016 |
| CN | 105515283 A | 4/2016 |
| CN | 105530361 A | 4/2016 |
| CN | 105791578 A | 7/2016 |
| CN | 105812567 A | 7/2016 |
| CN | 106054075 A | 10/2016 |
| CN | 107831899 A | 3/2018 |
| CN | 108258977 A | 7/2018 |
| TW | 201127003 A | 8/2011 |

OTHER PUBLICATIONS

Zheng (CN 108258977 A) Motor Vibration Control Method, Mobile Terminal and Computer Readable Storage Medium (Year: 2018).*

* cited by examiner

MOTOR VIBRATION CONTROL METHOD AND ELECTRONIC DEVICE

This application is a national stage of International Application No. PCT/CN2020/112884 filed on Sep. 1, 2020, which claims priority to Chinese Patent Application No. 201910883245.6 filed on Sep. 18, 2019. Both of the aforementioned applications are hereby incorporated by reference in their entireties.

FIELD

The embodiments relate to the field of terminal technologies, and in particular, to a motor vibration control method and an electronic device.

BACKGROUND

A motor is used to implement a vibration function in terminal devices such as a mobile phone, so that when a user performs a touch operation on the mobile phone, a touch feedback is received to confirm an operation execution status; or when the mobile phone receives a notification, vibration is generated to remind the user in time.

As consumer electronic devices, a mobile phone and other terminal products are used in various environments. When a temperature and a battery level change, a loading capability of a battery of the mobile phone also changes. When the temperature and the battery level decrease, the loading capability and an output current may decrease. When the loading capability is excessively low, a power failure occurs on the mobile phone. As a result, the mobile phone is powered off. Motor vibration of a common mobile phone is usually disabled when a loading capability of the mobile phone is excessively low, to prevent the mobile phone from being powered off due to a power failure. Consequently, the user cannot receive the touch feedback or vibration prompts.

SUMMARY

A motor vibration control method and an electronic device, when a loading capability of a battery is low, can drive a motor to vibrate without being powered off.

To achieve the foregoing objectives, the following solutions are used.

According to a first aspect, a motor vibration control method may include: A battery status is obtained when a first motor vibration waveform vibration request is received. The battery status includes a battery temperature, a battery temperature and a battery level, or a battery power supply capability. A motor vibration parameter is switched if the battery status meets a preset condition, where the preset condition is that the battery power supply capability is lower than a first threshold, the battery temperature is lower than a second threshold, or the battery temperature and the battery level are lower than a third threshold array. The motor vibration parameter includes a motor vibration waveform or a motor vibration input voltage. A motor is driven to vibrate based on a switched motor vibration parameter.

In this way, in a scenario in which a loading capability of a battery is low, a motor vibration waveform with low power consumption is switched to or a motor vibration input voltage is changed, to dynamically adjust motor vibration power consumption and reduce the motor vibration power consumption. Therefore, a mobile phone is not powered off due to an unexpected power failure.

In a possible implementation, the battery power supply capability is an input current of the battery to the motor. Switching the motor vibration parameter includes: A second motor vibration waveform is determined based on the battery power supply capability, where a peak current of the second motor vibration waveform is less than the battery power supply capability. A first motor vibration waveform is switched to the second motor vibration waveform.

In this way, a peak input current of a switched motor vibration waveform is limited by the current battery power supply capability, so that it can be ensured that the switched motor vibration waveform does not exceed the current battery power supply capability. This prevents a power failure caused by battery overload.

In a possible implementation, a plurality of motor vibration waveforms and a correspondence between the plurality of motor vibration waveforms and the battery power supply capability are preconfigured on the electronic device. Determining the second motor vibration waveform based on the battery power supply capability includes: The second motor vibration waveform is matched and determined from the plurality of motor vibration waveforms based on the battery power supply capability and the correspondence between the plurality of motor vibration waveforms and the battery power supply capability. The battery power supply capability is obtained based on the battery temperature and the battery level or is obtained through reading by the electronic device.

In this way, the correspondence between the battery power supply capability and the motor vibration waveform in a motor waveform library is established, to dynamically match a corresponding motor vibration waveform with low power consumption based on the battery power supply capability. This implements driving the motor to vibrate with low power consumption.

In a possible implementation, a correspondence between the battery temperature and the battery level, and the motor vibration waveform is prestored in the electronic device, and the motor vibration waveform indicated by the correspondence is a motor vibration waveform allowed under a condition of a corresponding battery temperature and battery level. Switching the motor vibration parameter includes: A motor vibration waveform is determined based on the obtained battery level, the obtained battery temperature, and the correspondence, and the determined motor vibration waveform is switched to and used. Alternatively, a motor vibration waveform is determined based on the obtained battery temperature and the correspondence, and the determined motor vibration waveform is switched to and used.

In this way, the correspondence between the battery temperature and the battery level, and the motor vibration waveform may be established, to directly match a motor vibration waveform with low power consumption based on the battery temperature, or to match a motor vibration waveform with low power consumption based on the battery temperature and the battery level. This implements fast and dynamic switching to the motor vibration waveform with low power consumption.

In a possible implementation, user vibration experience of the second motor vibration waveform is similar to that of the first motor vibration waveform.

In this way, the switched motor vibration waveform can bring, to a user, vibration experience similar to that before the switching, so that the user can directly determine a reason for current motor vibration based on the vibration experience. This improves user experience.

In a possible implementation, if there are a plurality of second motor vibration waveforms, the first motor vibration waveform is switched to one of the second motor vibration waveforms with a maximum vibration amount.

In a possible implementation, a motor waveform library is preconfigured on the electronic device, and motor waveforms in the motor waveform library are classified based on user vibration experience.

In a possible implementation, the motor waveform library further includes a plurality of third motor vibration waveforms. The battery power supply capability is divided based on preset intervals, where each preset interval corresponds to one third motor vibration waveform of the plurality of third motor vibration waveforms.

In a possible implementation, if no second motor vibration waveform is matched, the preset interval is matched based on a current battery power supply capability, and the third motor vibration waveform is matched based on the preset interval.

In this way, when no motor vibration waveform having similar vibration experience is matched from the motor vibration waveform library, the current motor vibration waveform may also be switched to a motor vibration waveform with low power consumption. This prevents battery overload.

In a possible implementation, the switching a motor vibration parameter, and the driving a motor to vibrate based on a switched motor vibration parameter include: A second peak input voltage is determined based on the battery power supply capability. A compression ratio is obtained based on the second peak input voltage and a first peak input voltage, and a first motor vibration input voltage is compressed based on the compression ratio, to generate a second motor vibration input voltage. The first peak input voltage is a peak voltage of a first motor vibration waveform, and the first motor vibration input voltage is a drive voltage of the first motor vibration waveform. The first motor vibration input voltage is switched to the second motor vibration input voltage. A fourth motor vibration waveform is generated based on the second motor vibration input voltage, and the motor is driven to vibrate according to the fourth motor vibration waveform. The second peak input voltage is a peak voltage of the fourth motor vibration waveform.

In this way, the peak input voltage that can be provided for the motor may be determined based on the current battery power supply capability. Then, the compression ratio is obtained based on the peak input voltage and the peak input voltage of the original motor vibration waveform. An original input voltage is compressed based on the compression ratio, to obtain a motor vibration input voltage with low power consumption.

In a possible implementation, the battery power supply capability includes an input voltage and an input current that are of a battery to the motor. Determining the second peak input voltage based on the battery power supply capability includes: A relationship between a peak input voltage and a peak input current of the motor is established according to a formula $v=k*i*(V/I)$ to determine the second peak input voltage. V represents the first peak input voltage. I represents a first peak input current, and the first peak input current is a peak current of the first motor vibration waveform. v represents the second peak input voltage. i represents a second peak input current, and the second peak input current is a maximum input current of the motor allowed by a current battery power supply capability. k represents a motor coefficient. V, I, v, and k are positive numbers.

In a possible implementation, the motor vibration control method further includes: The fourth motor vibration waveform is stored in a motor waveform library. If the motor vibration power consumption needs to be reduced, the peak value of the motor vibration waveform is staggered from an operation peak value with high power consumption.

According to a second aspect, an embodiment provides an electronic device that may be an apparatus for implementing the method in the first aspect. The electronic device may include one or more processors and a memory. The memory stores instructions, and when the instructions are executed by the one or more processors, the electronic device is enabled to perform: A battery status is obtained when a first motor vibration waveform vibration request is received, where the battery status includes a battery temperature, a battery temperature and a battery level, or a battery power supply capability. A motor vibration parameter is switched if the battery status meets a preset condition. The preset condition is that the battery power supply capability is lower than a first threshold, the battery temperature is lower than a second threshold, or the battery temperature and the battery level are lower than a third threshold array. The motor vibration parameter includes a motor vibration waveform or a motor vibration input voltage. A motor is driven to vibrate based on a switched motor vibration parameter.

In a possible implementation, the battery power supply capability is an input current of the battery to the motor. When the instructions are executed by the electronic device, the electronic device is enabled to perform: A second motor vibration waveform is determined based on the battery power supply capability, where a peak current of the second motor vibration waveform is less than the battery power supply capability. A first motor vibration waveform is switched to the second motor vibration waveform.

In a possible implementation, a plurality of motor vibration waveforms and a correspondence between the plurality of motor vibration waveforms and the battery power supply capability are preconfigured on the electronic device. When the instructions are executed by the electronic device, the electronic device is enabled to perform: The second motor vibration waveform is matched and determined from the plurality of motor vibration waveforms based on the battery power supply capability and the correspondence between the plurality of motor vibration waveforms and the battery power supply capability. The battery power supply capability is obtained based on the battery temperature and the battery level or is obtained through reading by the electronic device.

In a possible implementation, a correspondence between the battery temperature and the battery level, and the motor vibration waveform is prestored in the electronic device, and the motor vibration waveform indicated by the correspondence is a motor vibration waveform allowed under a condition of a corresponding battery temperature and battery level. When the instructions are executed by the electronic device, the electronic device is enabled to perform: A motor vibration waveform is determined based on the obtained battery level, the obtained battery temperature, and the correspondence, and the determined motor vibration waveform is switched to and used. Alternatively, a motor vibration waveform is determined based on the obtained battery temperature and the correspondence, and the determined motor vibration waveform is switched to and used.

In a possible implementation, user vibration experience of the second motor vibration waveform is similar to that of the first motor vibration waveform.

In a possible implementation, if there are a plurality of second motor vibration waveforms, the first motor vibration waveform is switched to one of the pluralities of second motor vibration waveforms with a maximum vibration amount.

In a possible implementation, a motor waveform library is preconfigured on the electronic device, and motor waveforms in the motor waveform library are classified based on user vibration experience.

In a possible implementation, the motor waveform library further includes a plurality of third motor vibration waveforms. The battery power supply capability is divided based on preset intervals, where each preset interval corresponds to one third motor vibration waveform of the plurality of third motor vibration waveforms.

In a possible implementation, if no second motor vibration waveform is matched, the preset interval is matched based on a current battery power supply capability, and the third motor vibration waveform is matched based on the preset interval.

In a possible implementation, when the instructions are executed by the electronic device, the electronic device is enabled to perform: A second peak input voltage is determined based on the battery power supply capability. A compression ratio is obtained based on the second peak input voltage and a first peak input voltage. A first motor vibration input voltage is compressed based on the compression ratio to generate a second motor vibration input voltage, where the first peak input voltage is a peak voltage of a first motor vibration waveform, and the first motor vibration input voltage is a drive voltage of the first motor vibration waveform. The first motor vibration input voltage is switched to the second motor vibration input voltage. A fourth motor vibration waveform is generated based on the second motor vibration input voltage, and the motor is driven to vibrate according to the fourth motor vibration waveform, where the second peak input voltage is a peak voltage of the fourth motor vibration waveform.

In a possible implementation, the battery power supply capability includes an input voltage and an input current that are of a battery to the motor. When the instructions are executed by the electronic device, the electronic device is enabled to perform: A relationship between a peak input voltage and a peak input current of the motor according to a formula $v=k*i*(V/I)$ to determine the second peak input voltage. V represents the first peak input voltage. I represents a first peak input current, and the first peak input current is a peak current of the first motor vibration waveform. v represents the second peak input voltage. i represents a second peak input current, and the second peak current is a maximum input current of the motor allowed by a current battery power supply capability. k represents a motor coefficient. V, I, v, and k are positive numbers.

In a possible implementation, when the instructions are executed by the electronic device, the electronic device is enabled to perform: The fourth motor vibration waveform is stored in a motor waveform library.

In a possible implementation, the electronic device is a system chip having a motor vibration control function.

According to a third aspect, an electronic device has a function of implementing the motor vibration control method according to any one of the first aspect and the possible implementations of the first aspect. The function may be implemented by hardware or may be implemented by hardware executing corresponding software. The hardware or the software includes one or more modules corresponding to the function.

According to a fourth aspect, a computer storage medium may include computer instructions. When the computer instructions are run on an electronic device, the electronic device is enabled to perform the motor vibration control method according to any one of the first aspect and the possible implementations of the first aspect.

According to a fifth aspect, a computer program product runs on an electronic device, configuring the electronic device to perform the motor vibration control method according to any one of the first aspect and the possible implementations of the first aspect.

According to a sixth aspect, a circuit system is provided. The circuit system includes a processing circuit, and the processing circuit is configured to perform the motor vibration control method according to any one of the first aspect and the possible implementations of the first aspect.

According to a seventh aspect, an embodiment provides a chip system, including at least one processor and at least one interface circuit. The at least one interface circuit is configured to: perform a transceiver function and send instructions to the at least one processor. When the at least one processor executes the instructions, the at least one processor performs the motor vibration control method according to any one of the first aspect and the possible implementations of the first aspect.

DETAILED DESCRIPTION OF THE EMBODIMENTS

The following describes in detail a motor vibration control method and an electronic device provided in embodiments with reference to the accompanying drawings.

The motor vibration control method provided in the embodiments may be applied to an electronic device such as a mobile phone, a tablet computer, a desktop computer, a laptop computer, a notebook computer, an ultra-mobile personal computer (UMPC), a handheld computer, a netbook, and a personal digital assistant (PDA), a wearable electronic device, a virtual reality device, or artificial intelligence (AI).

Figure 1:
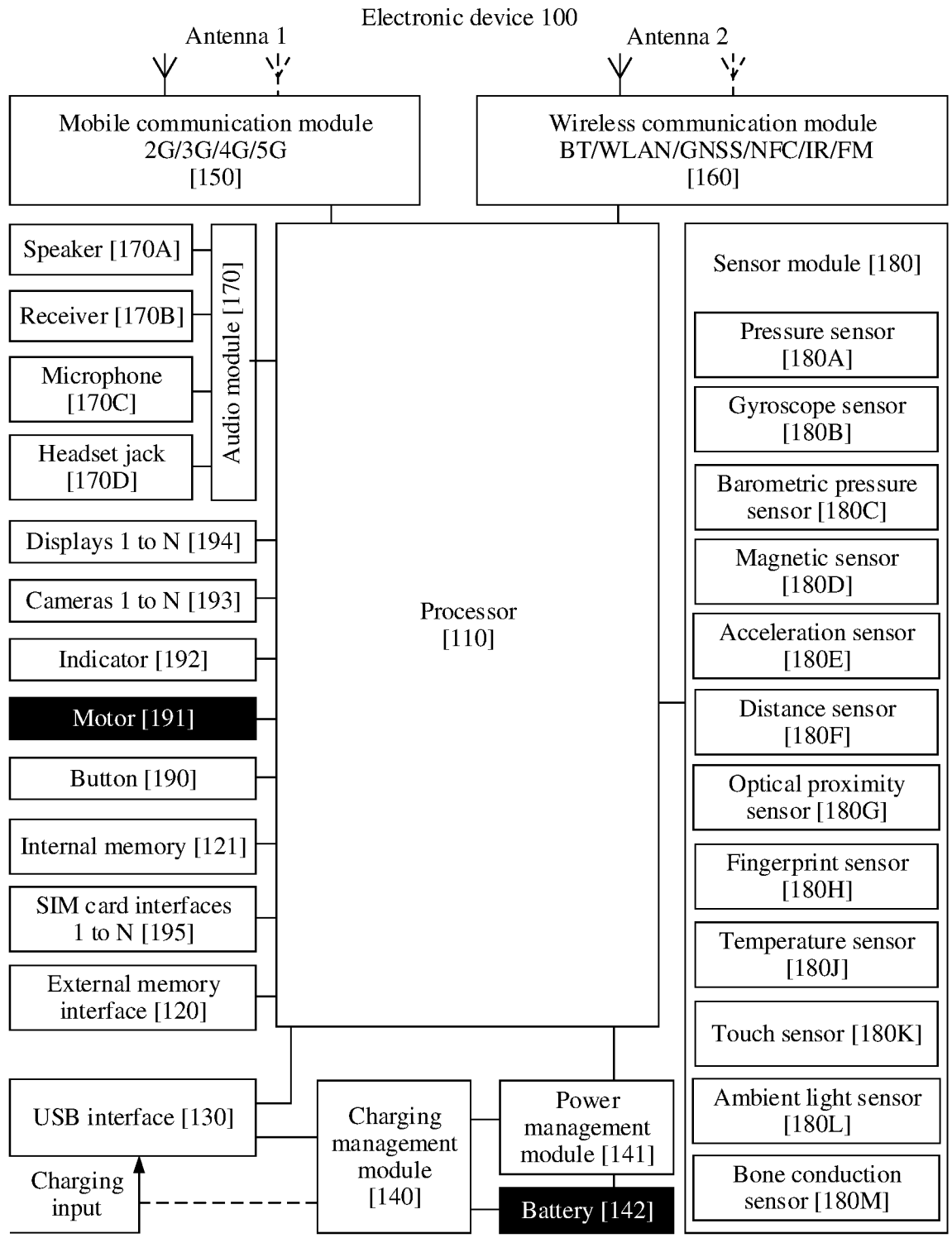
FIG. 1 is a schematic diagram of a structure of an electronic device according to an embodiment.

For example, FIG. 1 is a schematic diagram of a structure of an electronic device 100 by using a mobile phone as the electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments does not constitute a limitation on the electronic device 100. In some other embodiments, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a microprocessor, and/or a neural-network processing unit (NPU). Different processing units may be independent devices or may be integrated into one or more processors.

The controller may be a nerve center and a command center of the electronic device 100. The controller may generate an operation control signal based on an instruction operation code and a time sequence signal, to control to read instructions and execute instructions.

A memory may be further disposed in the processor 110 and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may alternatively transfer an audio signal to the wireless communication module 160 through the PCM interface, to implement a function of answering a call by using the Bluetooth headset. Both the I2S interface and the PCM interface may be configured to perform the audio communication.

The UART interface is a universal serial data bus and is configured to perform asynchronous communication. The bus may be a two-way communication bus. The bus switches to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification and may be a mini USB interface, a micro USB interface, a USB Type-C interface, or the like. The USB interface 130 may be configured to connect to a charger to charge the electronic device 100 or may be configured to transmit data between the electronic device 100 and a peripheral device, or may be configured to connect to a headset, to play audio by using the headset. This interface may be further configured to connect to another electronic device such as an AR device.

It can be understood that an interface connection relationship between modules illustrated in this embodiment is merely an example for description and does not constitute a limitation on the structure of the electronic device 100. In some other embodiments, the electronic device 100 may alternatively use an interface connection manner different from that in the foregoing embodiments, or a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be reused, to improve antenna utilization. For example, the antenna 1 may be reused as a diversity antenna in a wireless local area network. In some other embodiments, an antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor and convert the signal to an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110 and is disposed in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function by using the GPU, the display 194, the application processor, and the like. The GPU is a microprocessor for image processing and is connected to the display 194 and the application processor. The GPU is configured to perform mathematical and geometric calculation and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera 193 through a lens. An optical signal is converted into an electrical signal, and the photosensitive element of the camera 193 transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal and may process another digital signal in addition to the digital image signal. For example, when the electronic device 100 selects a frequency, the digital signal processor is configured to perform Fourier transformation on frequency energy.

The video codec is configured to: compress or decompress a digital video. The electronic device 100 may support one or more types of video codecs. In this way, the electronic device 100 can play or record videos in a plurality of encoding formats, for example, moving picture experts group (MPEG)-1, MPEG-2, MPEG-3, and MPEG-4.

The NPU is a neural-network NN) computing processor. The NPU quickly processes input information with reference to a structure of a biological neural network, for example, with reference to a transfer mode between human brain neurons and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a nonvolatile memory, for example, at least one magnetic disk storage device, a flash memory device, or a universal flash storage (UFS).

The electronic device 100 may implement audio functions such as music playing and recording functions by using the audio module 170, the speaker 170A, the receiver 170B, the microphone 170C, the headset jack 170D, the application processor, and the like.

The audio module 170 is configured to convert digital audio information into an analog audio signal for output and is also configured to convert an analog audio input into a digital audio signal. The audio module 170 may further be configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130 or may be a 3.5 mm open mobile terminal platform (OMTP) standard interface or a Cellular Telecommunications Industry Association of the USA (CTIA) standard interface.

The pressure sensor 180A is configured to sense a pressure signal and may convert the pressure signal into an electrical signal. In some embodiments, the pressure sensor 180A may be disposed on the display 194. There are plural types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on the Messages icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitudes of accelerations of the electronic device 100 in various directions (usually on three axes). When the electronic device 100 is still, a magnitude and a direction of gravity may be detected. The acceleration sensor 180E may be further configured to identify a posture of the electronic device and is used in an application such as switching between a landscape mode and a portrait mode or a pedometer.

The distance sensor 180F is configured to measure a distance. The electronic device 100 may measure the distance in an infrared manner or a laser manner. In some embodiments, in a shooting scenario, the electronic device 100 may measure a distance through the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being unexpectedly powered off due to a low temperature. In some other embodiments, when the temperature is less than still another threshold, the electronic device 100 boosts an output voltage of the battery 142 to prevent the electronic device 100 from being unexpectedly powered off due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or may be a touch-sensitive button. The electronic device 100 may receive a button input and generate a button signal input related to user setting and function control of the electronic device 100.

The indicator 192 may be an indicator, may be configured to indicate a charging status and a level change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or may be of different types. The SIM card interface 195 may be compatible with different types of SIM cards. The SIM card interface 195 may also be compatible with the external memory card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100 and cannot be separated from the electronic device 100.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, the motor 191, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

The motor 191 may generate a vibration prompt. The motor 191 may be configured for a vibration prompt of a notification (for example, an incoming call), or may be configured for vibration feedback of a touch operation. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. Different operations (for example, tapping, double-tapping, and touching and holding) performed by the user may also correspond to different vibration feedback effects. The vibration feedback effect can also be customized.

Figure 2:
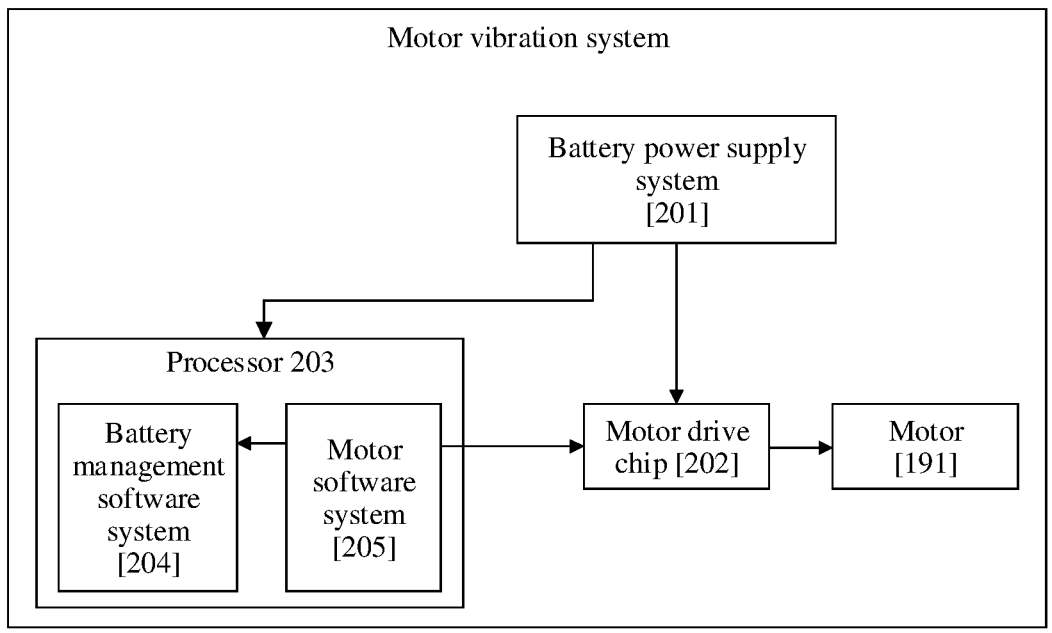
FIG. 2 is a schematic diagram of a structure of a motor vibration system according to an embodiment.

As shown in FIG. 2, for example, a motor vibration system in the electronic device is shown. The system includes a battery power supply system 201, a motor driver chip 202, a processor 203, and the motor 191.

The battery power supply system 201 is configured to supply power to the entire electronic device including the motor, and may include the power management module 141, the battery 142, the charging management module 140, and the like.

The motor driver chip 202 is configured to control power of a signal that drives the motor, and may be an independent chip, including a power amplifier (PA), a smart power amplifier (Smart PA), and the like. The motor driver chip 202 may alternatively be integrated in the processor 110 in FIG. 1, to implement generation and storage of motor vibration waveforms in some implementations of this embodiment.

The motor 191 is configured to generate vibration and convert an electrical signal into mechanical vibration.

The processor 203 is configured to control the electronic device, including control of motor vibration. The processor 203 may be the processor 110 shown in FIG. 1 or may be integrated into the processor 110 shown in FIG. 1. FIG. 2 shows an example in which the processor 203 includes a battery management software system 204 and a motor software system 205. The motor software system 205 or the motor driver chip 202 may support storage and generation of the motor vibration waveforms. This is not limited in the embodiments.

The battery management software system 204 is configured to detect and manage a status of a battery system, including a temperature, a level, an aging degree, an internal resistance, a supported voltage, a current, and the like of a current battery.

The motor software system 205 is configured to: receive a motor vibration request, convert the motor vibration request, and transmit a converted motor vibration request to the motor driver chip 202, so as to drive the motor 191 to vibrate.

In some implementations of this embodiment, the motor software system 205 may obtain information such as a battery temperature, a battery level, and a power supply capability from the battery management software system 204. Alternatively, the motor software system 205 may directly obtain raw data from the sensor module 180 shown in FIG. 1 and a hardware detection point, to obtain information such as a battery temperature and a power supply capability through algorithm calculation.

In some implementations of this embodiment, the battery management software system 204 may monitor a level and a temperature of the battery 142 in real time and may obtain current power supply capability data of the battery 142, for example, a maximum output current of the battery 142 in a current condition. Therefore, the electronic device 100 may determine, based on the power supply capability of the battery 142, whether vibration power consumption of the motor 191 needs to be reduced. If the power supply capability of the battery 142 is lower than a threshold, the vibration power consumption of the motor 191 needs to be reduced, to prevent a power failure of the electronic device 100.

The battery management software system monitors the battery power supply capability in real time and calculates a corresponding battery power supply capability based on changes in factors that affect the battery power supply capability. The factors that affect the battery power supply capability include a battery temperature, a battery level, a battery aging condition, and the like. The battery aging factor may be a quantity of times of charging and discharging, use duration, and the like. The battery aging factor affects the battery power supply capability for a long period of time. In the embodiments, impact of the battery temperature and the battery level on the battery power supply capability is considered.

Refer to the following Table 1. For example, Table 1 lists a correspondence table of the power supply capability of a type of battery, the battery 142, under different conditions of battery temperatures and battery levels. It can be learned from Table 1 that, at a same battery temperature, battery functional capabilities corresponding to different battery levels are different; with a same battery level, battery power supply capabilities corresponding to different battery temperatures are also different. Therefore, the battery temperature and the battery level need to be combined to learn the power supply capability of the battery 142 under the current condition, so as to determine whether operation power consumption of an application (for example, the motor 191) needs to be reduced in this case.

TABLE 1

| Battery temperature (° C.) | −5 | −5 | −5 | −10 | −10 | −10 | −20 | −20 |
|---|---|---|---|---|---|---|---|---|
| Battery level | 30% | 20% | 10% | 50% | 30% | 20% | 50% | 20% |
| Power supply capability (A) | 1.5 | 1.2 | 0.95 | 1.4 | 1.26 | 0.94 | 0.78 | 0.568 |

Figure 3:
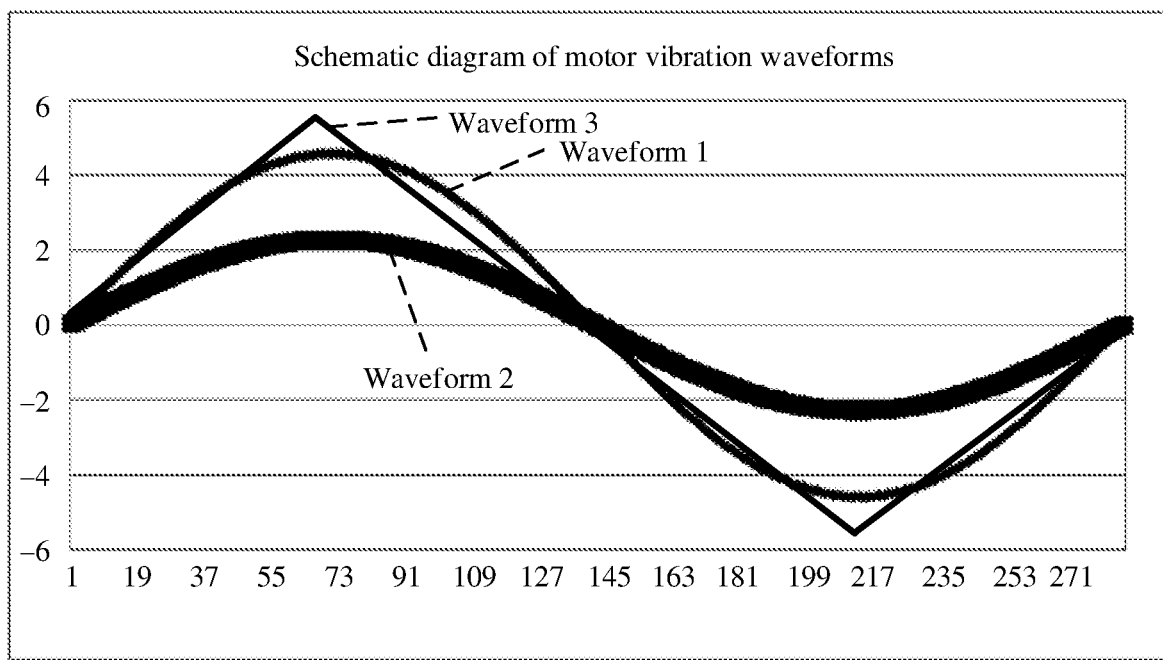
FIG. 3 is a schematic diagram of motor vibration waveforms according to an embodiment.
Figure 4A:
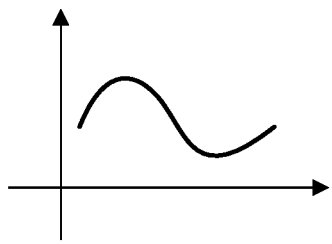
FIG. 4(a) is a schematic diagram of classification of a motor vibration waveform according to an embodiment.
Figure 4B:
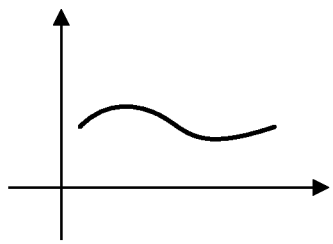
FIG. 4(b) is a schematic diagram of classification of a motor vibration waveform according to an embodiment.
Figure 4C:
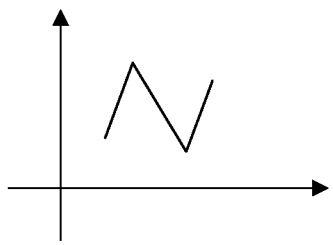
FIG. 4(c) is a schematic diagram of classification of a motor vibration waveform according to an embodiment.
Figure 4D:
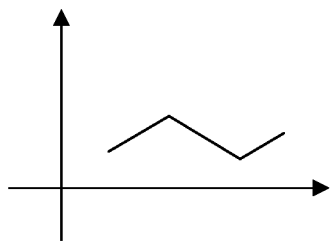
FIG. 4(d) is a schematic diagram of classification of a motor vibration waveform according to an embodiment.

The motor software system inputs a motor vibration waveform to the motor driver chip, and then drives the motor to vibrate according to the motor vibration waveform. Different motor vibration waveforms can bring different vibration experience to the user. As shown in FIG. 3, if motor vibration waveforms are gentler, such as a waveform 1 and a waveform 2, when a mobile phone vibrates, a vibration sense of the mobile phone may be gentler, duration is longer, and vibration experience of the user is smoother. If a motor vibration waveform is sharper, such as a waveform 3, when the mobile phone vibrates, a vibration sense of the mobile phone may be stronger, duration is shorter, and the user may obtain more stimulating vibration experience. Motor vibration waveforms with similar shapes can bring similar vibration experience to the user, but the user feels different vibration sense intensities with different vibration amounts. For example, if two motor vibration waveforms are gentle waveforms, a vibration amount of one waveform is 0.8 g, and a vibration amount of the other waveform is 0.4 g, the user may feel that a vibration sense of the vibration waveform with a larger vibration amount is stronger.

In some implementations, different motor vibration waveforms may be designed in advance, and the motor vibration waveforms are stored in a motor waveform library. In the motor waveform library, motor vibration waveforms may be numbered, so that a corresponding motor vibration waveform can be subsequently called by calling different motor vibration waveform numbers.

Optionally, in some implementations of this embodiment, vibration waveforms in the motor waveform library are classified based on conditions such as user vibration experience. FIG. 4(a) to FIG. 4(d) show an example of four different partial motor vibration waveforms including peak waveforms, and the four vibration waveforms may be divided into two groups based on user vibration experience. A first group is vibration waveforms whose user vibration experience is gentler, including two waveforms in FIG. 4(a) and in FIG. 4(b). The two waveforms have similar shapes but different vibration amounts. In this case, the user can obtain similar vibration experience, but different vibration sense intensities. A second group is vibration waveforms whose user vibration experience is more stimulating, including two waveforms in FIG. 4(c) and in FIG. 4(d). The two waveforms have similar shapes, and the user can obtain vibration with similar vibration experience.

Different motor vibration waveforms bring different vibration experience to users. Mobile phone manufacturers preconfigure the motor waveform library. During a development process, the mobile phone manufacturers select motor vibration waveforms for different applications or gestures from the motor waveform library. Third-party application developers select motor vibration waveforms from the motor waveform library during a third-party application development process. Statuses of the preconfigured motor vibration waveforms corresponding to different applications or gestures are stored in the internal memory 121 of the electronic device 100. There are two manners of storing the motor waveforms. One manner is to store motor vibration waveform data in the internal memory 121, and directly call a corresponding motor vibration waveform when necessary. The other is to store motor vibration waveform parameters such as an input voltage feature value and an input current feature value. The motor vibration waveform parameters such as the input voltage feature value and the input current feature value may be stored in the internal memory 121, and the corresponding motor vibration waveform parameters are invoked, when necessary, to generate motor vibration waveform data based on the motor vibration waveform parameters. During actual application, when the mobile phone detects some operations of the user, the mobile phone drives the motor to vibrate according to different vibration waveforms, so that the user can directly determine, based on vibration experience, whether a current operation is correct. For example, tapping corresponds to a waveform 1, double-tapping corresponds to a waveform 2, and touching and holding corresponds to a waveform 3. The waveform 1, the waveform 2, and the waveform 3 are motor vibration waveforms with different waveforms and have greatly different vibration experience. After double-tapping, the user may sense, based on vibration experience, whether a current vibration waveform is the vibration waveform 2, and further determine whether the mobile phone detects the double-tapping operation. If the detection is incorrect, for example, the mobile phone detects a tapping operation, and drives the motor to vibrate according to the waveform 1, the user may sense an operation exception based on the vibration experience and perform the tapping operation again. For another example, different vibration modes (different vibration waveforms) are set for an SMS message and a phone call. After the mobile phone receives an SMS message or receives an incoming call, the user may learn, based on different vibration experience, that a current vibration prompt is the new message or the new incoming call without viewing a screen of the mobile phone.

In some implementations of this embodiment, vibration power consumption of the motor 191 may be reduced, to adapt to a scenario in which a loading capability of the battery 142 is low, for example, a scenario in which a battery temperature is low and/or a battery level is low. An instantaneous vibration peak current generated when the motor 191 vibrates may be reduced by using a vibration waveform with low power consumption or by reducing an input voltage. This can effectively prevent a power failure due to overload of the battery 142.

Generally, a smaller amplitude of the motor vibration waveform indicates smaller voltage and current values, and lower power consumption. FIG. 3 shows an example of motor vibration waveforms generated by changes in an input voltage or a current with time. For example, the waveform 1 and the waveform 2 are two motor vibration waveforms that have similar user vibration experience. The waveform 2 has a smaller amplitude than that of the waveform 1, that is, a vibration current of the waveform 2 is smaller than a vibration current of the waveform 1. In this case, power consumption of the waveform 2 is lower than that of the waveform 1. In this way, if a motor vibration waveform corresponding to an application of the mobile phone is a waveform 1, when the mobile phone is in a scenario in which the loading capability is low, and needs to select a vibration waveform having similar user vibration experience and lower power consumption, the motor software system may select and input the waveform 2 to the motor driver chip, to drive the motor to vibrate according to the waveform 2.

Figure 5:
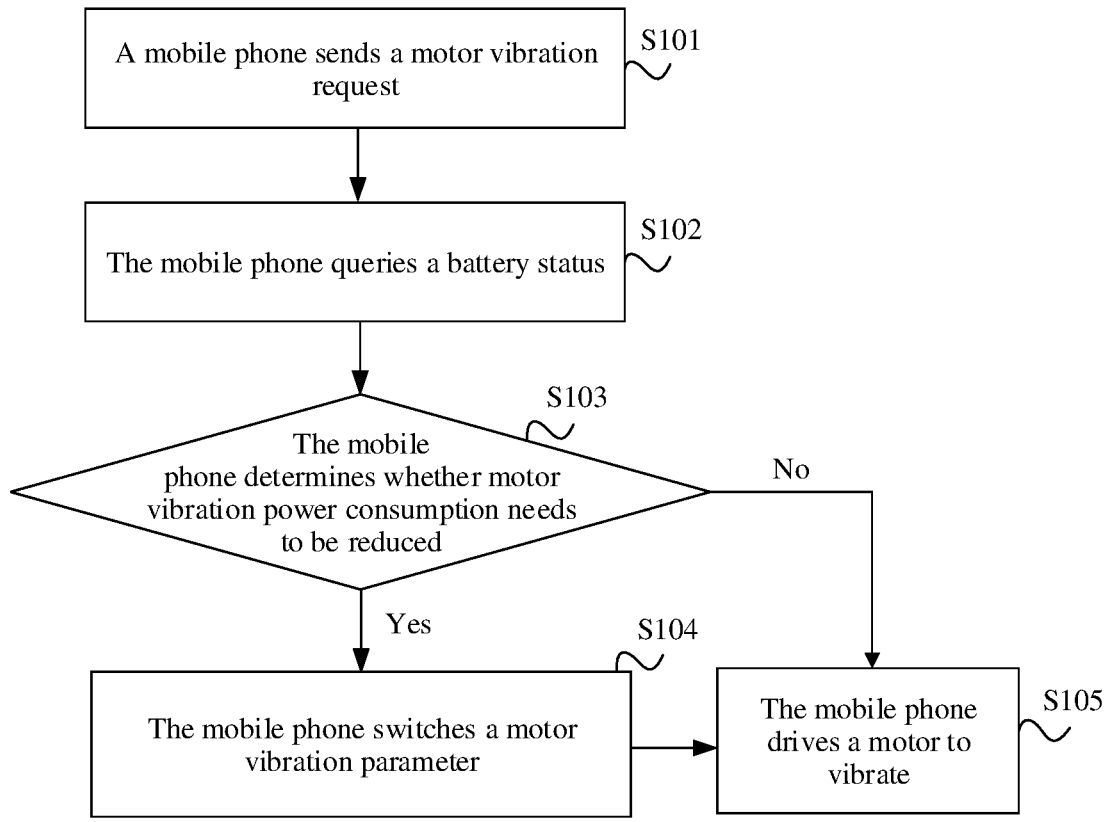
FIG. 5 is a schematic flowchart of a motor vibration control method according to an embodiment.

An embodiment may provide a motor vibration control method. As shown in FIG. 5, the method may include the following steps.

S101: A mobile phone sends a motor vibration request.

In a possible implementation, when the mobile phone receives a prompt, for example, when the mobile phone receives an incoming call signal or an SMS message signal, a motor needs to vibrate to remind a user. Alternatively, when the mobile phone detects some operations of the user, touch vibration needs to be performed to feed back to the user. In this case, the mobile phone sends the motor vibration request to the motor software system 205, to drive the motor to vibrate. In a process of processing the motor vibration request, a motor vibration waveform needs to be determined. In this case, the mobile phone queries a current battery status to match the corresponding motor vibration waveform or a corresponding input voltage.

It should be noted that, in this embodiment, when receiving the motor vibration request (the motor vibration waveform can be statically stored or dynamically loaded), the motor software system 205 determines the required motor vibration waveform and delivers a vibration command to the motor driver chip 202, to drive the motor 191 to vibrate.

S102: The mobile phone queries a battery status.

In a possible implementation, refer to FIG. 2. The mobile phone may query the current battery status from a battery power supply system 201 or a battery management software system 204. The battery status includes a battery temperature, a battery temperature and a battery level, or a battery power supply capability. The battery status is used to subsequently determine whether to reduce motor vibration power consumption. When the motor vibration power consumption needs to be reduced, a motor vibration parameter that needs to be switched to may be determined based on current battery status data. The motor vibration parameter may include a motor vibration waveform or a motor vibration wave input voltage. It may be understood that motor vibration waveforms in a motor waveform library have numbers. When a motor vibration parameter needs to be switched to the motor vibration waveform, the motor vibration parameter is a motor vibration waveform number, and a corresponding motor vibration waveform with low power consumption can be called by calling the motor vibration waveform number.

S103: The mobile phone determines whether the motor vibration power consumption needs to be reduced. If the motor vibration power consumption needs to be reduced, step S104 is performed, a motor vibration parameter with low power consumption is switched to. If the motor vibration power consumption does not need to be reduced, step S105 is performed and the current motor vibration parameter may still be used to drive the motor to vibrate.

In a possible implementation, a preset condition is set. When the battery status meets the preset condition, it is determined that the motor currently needs to be driven to vibrate with low power consumption, to prevent the mobile phone from being unexpectedly powered off due to an instantaneous peak current caused by vibration of the motor with high power consumption and that is higher than a power supply current of a battery. The preset condition is that the battery power supply capability is lower than a first threshold, the current battery temperature is lower than a second threshold, or the current battery temperature and battery level are lower than a third threshold array. The first threshold, the second threshold, and the third threshold may be obtained based on battery modeling data, test data, and empirical data, and are preconfigured on a terminal such as a mobile phone. The mobile phone may determine, based on a battery status parameter, the first threshold, the second threshold, and the third threshold, whether the motor currently needs to be driven to vibrate with low power consumption. If the motor needs to be driven to vibrate with low power consumption, the mobile phone needs to switch the motor vibration parameter to drive the motor to vibrate with low power consumption. If low power consumption processing is not required, the mobile phone may continue to drive the motor to vibrate based on the current motor vibration parameter.

S104: The mobile phone switches the motor vibration parameter.

The instantaneous peak current generated when the motor vibrates is reduced by switching the motor vibration parameter. Therefore, this reduces the motor vibration power consumption and prevents battery overload. The switching of the motor vibration parameter includes the following manners.

Manner 1:

In a possible implementation, a vibration waveform with low power consumption is switched to based on the power supply capability of the mobile phone, to drive the motor to vibrate. For example, the battery power supply capability may be classified into different power supply capability levels such as 1 A to 1.1 A and 1.1 A to 1.2 A. A vibration waveform whose peak current is less than a maximum power supply current (corresponding to a lower limit of the power supply capability level) of the mobile phone is selected, to effectively reduce the motor vibration power consumption. The power supply capability level of the mobile phone may be obtained based on the battery temperature and the battery level, or a value of the power supply capability may be directly obtained from the battery management software system, and includes a value of the maximum power supply current of the mobile phone.

To ensure user vibration experience, when a loading capability of the battery of the mobile phone is low and a waveform with low power consumption needs to be switched to, the mobile phone may switch to the waveform with low power consumption that has similar vibration experience for the user. The following Table 2 lists an example of four waveforms 36 to 39 that have similar waveform shapes in the motor waveform library and similar user vibration experience. In other words, the four waveforms belong to a same classification group. Table 2 also includes a waveform 44. The waveform 44 belongs to another group of waveforms with low power consumption and has different vibration experience from that of the waveforms 36 to 39. Voltages need to be normalized, to unify a measurement standard and ensure obtaining vibration peak currents under a same voltage condition. The following Table 2 shows vibration amounts and vibration peak currents of different motor vibration waveforms when the voltages are normalized to 3.8 V.

TABLE 2

| Vibration waveform number | 36 | 39 | 38 | 37 | 44 |
|---|---|---|---|---|---|
| Vibration amount (g) | 1.5 | 0.4 | 0.8 | 1.15 | 0.2 |
| Vibration peak current (A) | 3.236 | 0.36 | 0.9504 | 2.665 | 1.827 |

Optionally, when the loading capability of the battery decreases, and a vibration feedback is required for an application or a gesture, a waveform with low power consumption may be selected from a preconfigured motor waveform library based on a current battery power supply capability, where the waveform has a similar vibration experience to that of a vibration waveform corresponding to operating the application or the gesture. For example, an original motor vibration waveform is the waveform 36. When the loading capability of the battery decreases, the motor vibration waveform can be switched to a waveform 37.

Optionally, the battery temperature and the battery level affect the battery power supply capability. Therefore, a motor vibration waveform that is available under a condition of a current temperature and level may be selected based on the battery power supply capability and the motor vibration peak current. A vibration peak current of the selected vibration waveform may be lower than the battery power supply capability, so that a current power supply current of the battery meets a motor vibration requirement without causing mobile phone battery overload.

For example, the following Table 3 is obtained based on Table 1 and Table 2. The mobile phone determines a current battery power supply capability based on the current battery temperature and battery level, and then matches a corresponding motor vibration wave waveform with low power consumption based on the battery power supply capability, to drive the motor to vibrate.

TABLE 3

| Battery temperature (° C.) | −5 | −5 | −5 | −10 | −10 | −10 | −20 | −20 |
|---|---|---|---|---|---|---|---|---|
| Battery level | 30% | 20% | 10% | 50% | 30% | 20% | 50% | 20% |
| Power supply capability (A) | 1.5 | 1.2 | 0.95 | 1.4 | 1.26 | 0.94 | 0.78 | 0.568 |
| Available motor vibration wave | 38 and 39 | 38 and 39 | 39 | 38 and 39 | 38 and 39 | 39 | 39 | 39 |

For another example, a correspondence between a battery temperature and a battery level, and an optional motor vibration waveform is preconfigured on the mobile phone. Further, refer to Table 4. The mobile phone may directly match a corresponding motor vibration wave waveform with low power consumption based on the current battery temperature and battery level, to drive the motor to vibrate.

TABLE 4

| Battery temperature (° C.) | −5 | −5 | −5 | −10 | −10 | −10 | −20 | −20 |
|---|---|---|---|---|---|---|---|---|
| Battery level | 30% | 20% | 10% | 50% | 30% | 20% | 50% | 20% |
| Available motor vibration wave | 38 and 39 | 38 and 39 | 39 | 38 and 39 | 38 and 39 | 39 | 39 | 39 |

For another example, a correspondence between a battery temperature and an optional motor vibration waveform is preconfigured on the mobile phone. Further, refer to Table 5. The mobile phone may directly match a corresponding motor vibration wave waveform with low power consumption based on the current battery temperature, to drive the motor to vibrate.

TABLE 5

| Battery temperature (° C.) | −5 | −10 | −15 | −20 |
|---|---|---|---|---|
| Available motor vibration wave | 38 | 38 | 39 | 39 |

For another example, when the mobile phone may directly obtain the battery power supply capability, refer to Table 6. The mobile phone may directly match a corresponding motor vibration wave waveform with low power consumption based on the current battery power supply capability, to drive the motor to vibrate.

TABLE 6

| Power supply capability (A) | 1.5 | 1.2 | 0.95 | 1.4 | 1.26 | 0.94 | 0.78 | 0.568 |
|---|---|---|---|---|---|---|---|---|
| Available motor vibration wave | 38 and 39 | 38 and 39 | 39 | 38 and 39 | 38 and 39 | 39 | 39 | 39 |

Optionally, when there is a plurality of optional motor vibration waveforms, selection may be performed from the plurality of optional motor vibration waveforms based on an actual experience requirement of the user. For example, in waveforms having similar vibration experience, a corresponding waveform may be selected based on a magnitude of a vibration amount, and a waveform having a larger vibration amount may bring a stronger vibration sense to the user. Refer to Table 3. When the current battery temperature is −5° C. and the battery level is 30%, there are two vibration waveforms available: the waveform 38 and the waveform 39. For example, a motor vibration waveform having a larger vibration amount may be selected, and the user may have vibration experience of a stronger vibration sense. For example, the vibration waveform 38 is selected to drive the motor to vibrate. Alternatively, if the user is in a noisy environment (for example, the user is shopping), refer to Table 2. The vibration waveform 38 having a larger vibration amount may be selected to drive the motor to vibrate, so that the user can quickly sense the vibration. Alternatively, if the user is in a quiet environment (for example, the user is reading a book in a library), refer to Table 2. The motor may select the vibration waveform 39 having a smaller vibration amount to implement vibration, so that the user can sense the vibration without affecting other readers.

Optionally, a group of general motor vibration waveforms with low power consumption may be established in the motor waveform library. Refer to the following Table 6. The group of general motor vibration waveforms with low power consumption include motor vibration waveforms with low power consumption 90 to 94. The battery power supply capability is divided based on intervals, and each interval corresponds to a waveform in the group of general waveforms with low power consumption. When the mobile phone selects a waveform having similar user vibration experience from the motor waveform library, no corresponding waveform is matched. In this case, the mobile phone may select a general waveform with low power consumption corresponding to a lower limit of the power supply capability in Table 4 which the current battery power supply capability is greater than or equal to. In this way, the waveform with low power consumption is switched to, and overload of the battery is prevented. For example, the current battery power supply capability is 0.94 A, and no motor vibration waveform with low power consumption that has similar user vibration experience to that of a current motor vibration waveform is matched. In this case, refer to the following Table 7. 0.94 A>0.7 A, and a motor vibration waveform 91 is selected to drive the motor to vibrate.

TABLE 7

| Battery temperature (° C.) | −25 | −20 | −5 | −5 | −5 |
|---|---|---|---|---|---|
| Battery level (%) | 20 | 40 | 15 | 20 | 30 |
| Lower limit of a power supply capability (A) | 0.3 | 0.7 | 1 | 1.2 | 1.5 |
| Available motor vibration waveform | 90 | 91 | 92 | 93 | 94 |

It should be noted that Table 1 and Table 2 are merely examples of some conditions of the battery status and some motor vibration wave parameters. Therefore, it can be understood that Table 3, Table 4, and Table 5 may further include more conditions of the battery status and corresponding available motor vibration waveforms. In addition, when voltages are normalized to 3.8 V in Table 2, Table 3, Table 4, Table 5, and Table 6, vibration peak currents are determined, and then an available vibration waveform number is selected. A purpose of the normalizing the voltages is to unify the measurement standard and obtain vibration peak currents under a same voltage condition. The normalized voltage may alternatively be another value, for example, 4.2 V. This is not limited in the embodiments.

Further, in the foregoing Table 3, Table 4, Table 5, and Table 6, it is only considered that the motor vibration peak current needs to be less than the battery power supply capability in a process of selecting the available motor vibration waveform. It may be understood that, because the battery also needs to supply power to another component in the mobile phone, a preset threshold may be set. When a difference between the motor vibration peak current and the current of the battery power supply capability is greater than the preset threshold, a corresponding vibration waveform is the available motor vibration waveform. The preset threshold may be empirical data obtained through tests. This is not limited in the embodiments.

In this way, as shown in Table 3, Table 4, Table 5, and Table 6, a correspondence table between a battery temperature, a battery level, and a power supply capability, and an available vibration waveform number is established and stored in a memory of the mobile phone. When determining that the current motor needs to vibrate with low power consumption, the mobile phone may match, by using the corresponding table, a corresponding available motor vibration waveform in vibration waveforms having similar user vibration experience.

Manner 2:

In a possible implementation, an input voltage for driving the motor to vibrate is changed, to reduce power consumption generated when the motor vibrates. For example, an input voltage currently available for driving the motor to vibrate may be obtained based on the power supply capability (power supply current) of the battery. For example, a peak value relationship between a voltage and a current may be established according to a formula v=k*i*(V/I), to obtain a corresponding input voltage with low power consumption. V represents a peak input voltage of an original motor vibration waveform. I represents a power supply current of the original motor vibration waveform. V represents a peak input voltage with low power consumption of a required motor vibration waveform under a condition of a current battery status. i represents a current power supply current capability of the battery to the motor. k represents a motor coefficient and is related to motor specifications and a motor design system. The measured empirical value of k varies with the motor specifications and the motor design system. For example, when k=1, v/i=V/I may be obtained according to the foregoing formula, that is, an input voltage for implementing motor vibration currently may be obtained, and the input voltage is a peak voltage of the motor vibration waveform. A compression ratio is calculated based on the peak voltage and the peak voltage of the current motor vibration waveform, and the current motor vibration waveform is compressed based on the ratio in an equal proportion, to obtain a switched motor vibration waveform. This effectively reduces motor vibration power consumption.

Optionally, the proportionally compressed motor vibration waveform may be stored in the motor waveform library in the manner 1. In this case, when the motor vibration waveform is required again subsequently, the motor vibration waveform may be directly called without recalculation.

It should be noted that calculating the input voltage of the motor vibration waveform may also be related to motor model modeling. When a mobile phone manufacturer configures a motor for a mobile phone, modeling training and verification are performed on parameters that affect quality of the motor, and optimal parameters are selected to control the quality of the motor. Different models and quality of motors may implement different input voltages. After the manufacturer configures a motor for a mobile phone by using the motor model, the mobile phone obtains the input voltage according only to the foregoing formula without considering impact of different motor models on the input voltage.

In this way, when the loading capability of the mobile phone decreases and a parameter needs to be replaced for the motor, an available motor vibration waveform with low power consumption having similar user vibration experience may be first matched based on the battery power supply capability, or a battery temperature and a battery level from a motor waveform library preconfigured on the mobile phone. If no available motor vibration waveform is matched from the motor waveform library, the foregoing formula may alternatively be used to determine an input voltage that can be provided based on the current battery status for the motor. In this way, the battery provides the proportionally compressed input voltage, to implement motor vibration with low power consumption. Alternatively, when no available motor vibration waveform having similar user vibration experience is matched from the motor waveform library, a general motor vibration waveform with low power consumption that meets a current power supply capability may be matched. This reduces motor vibration power consumption and prevents the mobile phone from being powered off due to an unexpected power failure.

S105: The mobile phone drives the motor to vibrate.

In a possible implementation, in step S103, when the mobile phone determines that the current battery status can meet a current motor vibration condition, that is, vibration with low power consumption is not required, step S104 does not need to be performed, and step S105 is directly performed. The mobile phone drives the motor to vibrate by using the current motor vibration parameter.

In a possible implementation, after matching the foregoing switched motor vibration parameter with low power consumption, the motor software system drives, based on the vibration parameter, the motor to vibrate, to provide vibration feedback for the user. This implements motor vibration in a case of a low loading capability of the battery.

In another possible implementation, a large-capacitance component may be added to the motor and is configured to filter the vibration peak value of the motor vibration waveform, to implement a smooth peak current. In other words, no increased instantaneous current is generated when the motor vibrates, so that the power supply capability of the battery is not exceeded, and the battery is not overloaded. When the loading capability of the battery is low, a vibration function of the mobile phone can be ensured without powering off the mobile phone due to an unexpected power failure caused by vibration.

In another possible implementation, in step S103, when the mobile phone determines that the motor needs to vibrate with low power consumption, that is, when the mobile phone determines that a current scenario is a scenario in which a loading capability of the mobile phone is low, a peak value of a voltage used when the motor vibrates can be staggered from a peak value of a voltage used in an application with high power consumption in the output voltage of the battery of the mobile phone. In other words, this prevents a case in which the application with high power consumption runs simultaneously as the motor vibration waveform reaches a peak value, causing an excessively high instantaneous current and a power failure due to battery overload. For example, when the mobile phone takes photos, an instantaneous peak voltage is high at a moment when a shutter is pressed to take photos. In this case, if there is a vibration prompt of an incoming call or an SMS message, a peak value of the vibration of the motor may be staggered from the peak value of the photographing voltage at different time. This ensures that the supply capability at the current battery status is sufficient to implement the vibration of the current motor vibration waveform.

According to the motor vibration control method, in a scenario in which the loading capability of the battery is low, the motor vibration waveform with low power consumption is switched to or an input voltage of the motor vibration waveform is changed, to dynamically adjust motor vibration power consumption and implement motor vibration with low power consumption. Therefore, the mobile phone is not powered off due to the unexpected power failure. This resolves poor user experience in the conventional technology caused by disabling a motor vibration function when the mobile phone is in the scenario in which the loading capability of the battery is low.

Figure 6:
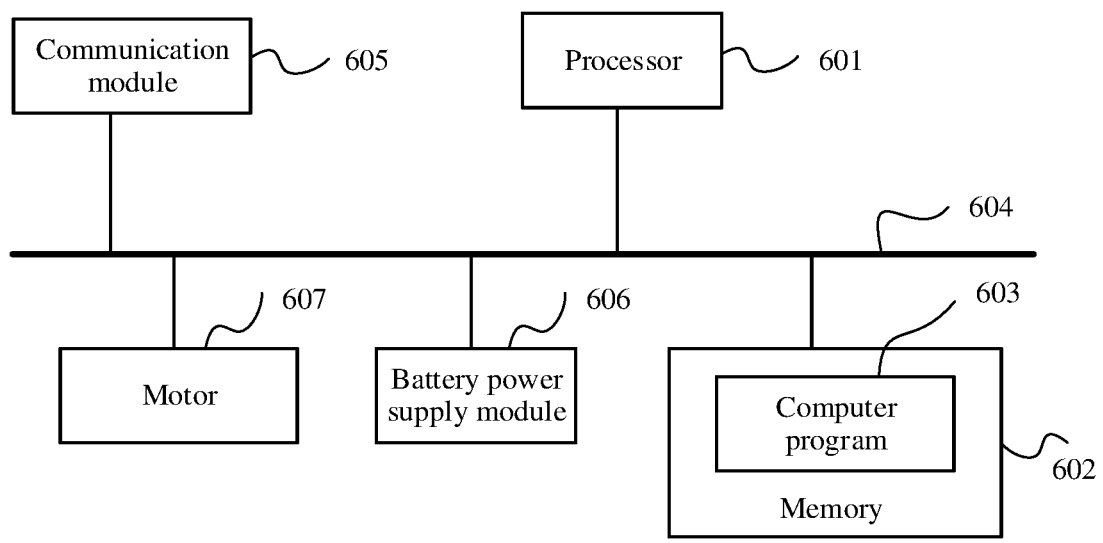
FIG. 6 is a schematic diagram of a structure of an electronic device according to an embodiment.

As shown in FIG. 6, an embodiment discloses an electronic device, including one or more processors 601, a memory 602, and one or more computer programs 603. The foregoing components may be connected through one or more communication buses 604. The one or more computer programs 603 are stored in the memory 602 and are configured to be executed by the one or more processors 601. The one or more computer programs 603 include instructions, and the instructions may be used to perform the steps in the motor vibration control embodiments.

For example, the processor 601 may be the processor 110 shown in FIG. 1, and the memory 602 may be the internal memory 121 shown in FIG. 1.

The electronic device further includes a communication module 605, a battery power supply module 606, and a motor 607. The communication module 605 may be the mobile communication module 150 and/or the wireless communication module 160 shown in FIG. 1. The battery power supply module 606 may include the charging management module 140, the power management module 141, and the battery 142 shown in FIG. 1. The motor 607 may be the motor 191 shown in FIG. 1. This is not limited in the embodiments. The battery power supply module 606 and the motor 607 may be configured to perform steps in the motor vibration control method.

The processor 601 may be a processor or a controller, for example, a central processing unit (CPU), a GPU, a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to disclosed content. The processor may alternatively be a combination of processors implementing a computing function, for example, a combination of one or more microprocessors, or a combination of the DSP and a microprocessor.

The communication module 605 may be a transceiver, a transceiver circuit, an input/output device, a communication interface, or the like. For example, the communication module 605 may be a Bluetooth apparatus, a Wi-Fi apparatus, a peripheral interface, or the like.

The memory 602 may include a high-speed random access memory or another type of static storage device that may store static information and instructions, a random access memory (RAM) or another type of dynamic storage device that may store information and instructions. The memory 602 may alternatively be an electrically erasable programmable read-only memory (EEPROM), or any other medium that can be configured to carry or store expected program code in a form of an instruction or a data structure and that can be accessed by a computer. However, this is not limited thereto. The memory 602 may exist independently and is connected to the processor 601 through the communication bus 604. Alternatively, the memory 602 may be integrated with the processor 601.

Figure 7:
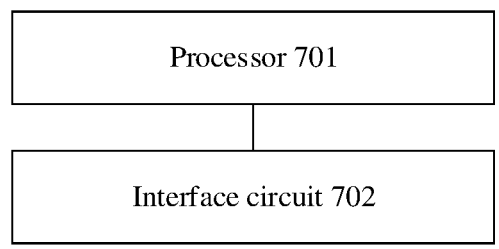
FIG. 7 is a schematic diagram of a structure of a chip system according to an embodiment.

An embodiment further provides a chip system. As shown in FIG. 7, the chip system includes at least one processor 701 and at least one interface circuit 702. The processor 701 and the interface circuit 702 may be interconnected through a line. For example, the interface circuit 702 may be configured to receive a signal from another apparatus. For another example, the interface circuit 702 may be configured to send a signal to another apparatus (for example, the processor 701). For example, the interface circuit 702 may read instructions stored in a memory and send the instructions to the processor 701. When the instructions are executed by the processor 701, an electronic device may be enabled to perform the steps performed by the electronic device 100 in the foregoing embodiments. The chip system may further include another discrete component. This is not limited in the embodiments.

An embodiment further provides a computer storage medium. The computer storage medium stores computer instructions. When the computer instructions run on an electronic device, the electronic device is enabled to perform the foregoing related method steps, to implement the motor vibration control method in the foregoing embodiments.

An embodiment further provides a computer program product. When the computer program product runs on a computer, the computer performs the foregoing related steps, to implement the motor vibration control method in the foregoing embodiments.

In addition, an embodiment further provides an apparatus. The apparatus may be a component or a module, and the apparatus may include a processor and a memory that are connected to each other. The memory is configured to store computer-executable instructions. When the apparatus runs, the processor may execute the computer-executable instructions stored in the memory, so that the apparatus performs the motor vibration control method in the foregoing method embodiments.

The electronic device, the computer storage medium, the computer program product, or the chip provided in the embodiments may be all configured to perform the corresponding method provided above. Therefore, for beneficial effects that can be achieved, refer to the beneficial effects of the corresponding method provided above. Details are not described herein again.

It should be understood that the motor vibration control method provided in the embodiments may be performed by an electronic device. The electronic device may be an entire computing device or may be a part of components of the computing device, for example, a chip related to a motor vibration function such as a system chip or a communication chip having a function of a motor vibration control method. The system chip of the motor vibration control method is also referred to as a system on chip (SOC). A wireless communication apparatus may be a terminal such as a smartphone, or may be a system chip or a communication chip that can be disposed on the terminal and that has a function of a motor vibration control method.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above. For detailed working processes of the foregoing system, apparatus, and unit, refer to corresponding processes in the foregoing method embodiments. Details are not described herein again.

In the several embodiments, the disclosed methods may be implemented in other manners. For example, the described electronic device embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the modules or units may be implemented in electronic, mechanical, or other forms.

The units described as separate parts may or may not be physically separate. Parts displayed as units may or may not be physical units, in other words, may be located in one position, or may be distributed on a plurality of network units. A part or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of the software functional unit and sold or used as an independent product, the integrated unit may be stored in a non-transitory computer-readable storage medium. Based on such an understanding, the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes any medium that can store program instructions, such as a flash memory, a removable hard disk, a read-only memory, a random access memory, a magnetic disk, or an optical disc.

The foregoing description is merely an implementation, but is not intended to be limiting. Any variation or replacement shall fall within the scope of the embodiments.

What is claimed is:

1. A motor vibration control method, applied to an electronic device, wherein the motor vibration control method comprises:
   obtaining a battery status when a first motor vibration waveform vibration request is received, wherein the battery status comprises at least one of a battery temperature, a battery temperature and a battery level, or a battery power supply capability;
   switching a motor vibration parameter when the battery status meets a preset condition, wherein the preset condition is that the battery power supply capability is lower than a first threshold or the battery temperature is lower than a second threshold, and the motor vibration parameter comprises a motor vibration waveform or a motor vibration input voltage; and
   driving a motor to vibrate based on a switched motor vibration parameter.

2. The motor vibration control method according to claim 1, wherein the battery power supply capability is an input current of a battery to the motor, and switching the motor vibration parameter further comprises:
   determining a second motor vibration waveform based on the battery power supply capability, wherein a peak current of the second motor vibration waveform is less than the battery power supply capability; and
   switching a first motor vibration waveform to the second motor vibration waveform.

3. The motor vibration control method according to claim 2, wherein a plurality of motor vibration waveforms and a correspondence between the plurality of motor vibration waveforms and the battery power supply capability are preconfigured on the electronic device, and determining the second motor vibration waveform based on the battery power supply capability further comprises:
   matching and determining the second motor vibration waveform from the plurality of motor vibration waveforms based on the battery power supply capability and the correspondence between the plurality of motor vibration waveforms and the battery power supply capability, wherein the battery power supply capability is obtained based on the battery temperature and the battery level, or is obtained through reading by the electronic device.

4. The motor vibration control method according to claim 2, wherein user vibration experience of the second motor vibration waveform is similar to that of the first motor vibration waveform.

5. The motor vibration control method according to claim 2, wherein the first motor vibration waveform is switched to one of the pluralities of second motor vibration waveforms with a maximum vibration amount when there area pluralities of second motor vibration waveforms.

6. The motor vibration control method according to claim 1, wherein a correspondence between the battery temperature and the battery level, and the motor vibration waveform is prestored in the electronic device, the motor vibration waveform indicated by the correspondence is a motor vibration waveform allowed under a condition of a corresponding battery temperature and battery level, and switching the motor vibration parameter further comprises:
  determining a motor vibration waveform based on the obtained battery level, the obtained battery temperature, and the correspondence, and switching to and using the determined motor vibration waveform; or
  determining a motor vibration waveform based on the obtained battery temperature and the correspondence, and switching to and using the determined motor vibration waveform.

7. The motor vibration control method according to claim 1, wherein a motor waveform library is preconfigured on the electronic device and motor waveforms in the motor waveform library are classified based on user vibration experience.

8. The motor vibration control method according to claim 7, wherein the motor waveform library further comprises a plurality of third motor vibration waveforms, the battery power supply capability is divided based on preset intervals, and each preset interval corresponds to one third motor vibration waveform of the plurality of third motor vibration waveforms.

9. The motor vibration control method according to claim 8, wherein the preset interval is matched based on a current battery power supply capability, and the third motor vibration waveform is matched based on the preset interval when no second motor vibration waveform is matched.

10. The motor vibration control method according to claim 1, wherein the switching a motor vibration parameter, and driving the motor to vibrate based on a the switched motor vibration parameter further comprises:
  determining a second peak input voltage based on the battery power supply capability;
  obtaining a compression ratio based on the second peak input voltage and a first peak input voltage;
  compressing a first motor vibration input voltage based on the compression ratio to generate a second motor vibration input voltage, wherein the first peak input voltage is a peak voltage of a first motor vibration waveform, and the first motor vibration input voltage is a drive voltage of the first motor vibration waveform;
  switching the first motor vibration input voltage to the second motor vibration input voltage;
  generating a fourth motor vibration waveform based on the second motor vibration input voltage; and
  driving the motor to vibrate according to the fourth motor vibration waveform, wherein the second peak input voltage is a peak voltage of the fourth motor vibration waveform.

11. An electronic device, comprising:
one or more processors;
a memory; and
one or more computer programs, wherein the one or more computer programs are stored in the memory, the one or more computer programs comprise instructions, and when the instructions are executed by the electronic device, the electronic device is configured to perform:
  obtaining a battery status when a first motor vibration waveform vibration request is received, wherein the battery status comprises at least one of a battery temperature, a battery temperature and a battery level, or a battery power supply capability;
  switching a motor vibration parameter when the battery status meets a preset condition, wherein the preset condition is that the battery power supply capability is lower than a first threshold, the battery temperature is lower than a second threshold, or the battery temperature and the battery level are lower than a third threshold array, and the motor vibration parameter comprises a motor vibration waveform or a motor vibration input voltage; and
  driving a motor to vibrate based on a switched motor vibration parameter.

12. The electronic device according to claim 11, wherein the battery power supply capability is an input current of a battery to the motor, and when the instructions are executed by the electronic device, the electronic device is further configured to perform:
  determining a second motor vibration waveform based on the battery power supply capability, wherein a peak current of the second motor vibration waveform is less than the battery power supply capability; and
  switching a first motor vibration waveform to the second motor vibration waveform.

13. The electronic device according to claim 12, wherein a plurality of motor vibration waveforms and a correspondence between the plurality of motor vibration waveforms and the battery power supply capability are preconfigured on the electronic device, and when the instructions are executed by the electronic device, the electronic device is further configured to perform:
  matching and determining the second motor vibration waveform from the plurality of motor vibration waveforms based on the battery power supply capability and the correspondence between the plurality of motor vibration waveforms and the battery power supply capability, wherein the battery power supply capability is obtained based on the battery temperature and the battery level, or is obtained through reading by the electronic device.

14. The electronic device according to claim 12, wherein user vibration experience of the second motor vibration waveform is similar to that of the first motor vibration waveform.

15. The electronic device according to claim 12, wherein the first motor vibration waveform is switched to one of the pluralities of second motor vibration waveforms with a maximum vibration amount when there are pluralities of second motor vibration waveforms.

16. The electronic device according to claim 11, wherein a correspondence between the battery temperature and the battery level, and the motor vibration waveform is prestored in the electronic device, and the motor vibration waveform indicated by the correspondence is a motor vibration waveform allowed under a condition of a corresponding battery temperature and battery level and when the instructions are executed by the electronic device, the electronic device is further configured to perform:

determining a motor vibration waveform based on the obtained battery level, the obtained battery temperature, and the correspondence, and switching to and using the determined motor vibration waveform; or determining a motor vibration waveform based on the obtained battery temperature and the correspondence, and switching to and using the determined motor vibration waveform.

17. The electronic device according to claim 11, wherein a motor waveform library is preconfigured on the electronic device, and motor waveforms in the motor waveform library are classified based on user vibration experience.

18. The electronic device according to claim 17, wherein the motor waveform library further comprises a plurality of third motor vibration waveforms, the battery power supply capability is divided based on preset intervals, and each preset interval corresponds to one third motor vibration waveform of the plurality of third motor vibration waveforms.

19. The electronic device according to claim 18, wherein the preset interval is matched based on a current battery power supply capability, and the third motor vibration waveform is matched based on the preset interval when no second motor vibration waveform is matched.

20. The electronic device according to claim 11, wherein when the instructions are executed by the electronic device, the electronic device is further configured to perform:
  determining a second peak input voltage based on the battery power supply capability;
  obtaining a compression ratio based on the second peak input voltage and a first peak input voltage;
  compressing a first motor vibration input voltage based on the compression ratio to generate a second motor vibration input voltage, wherein the first peak input voltage is a peak voltage of a first motor vibration waveform, and the first motor vibration input voltage is a drive voltage of the first motor vibration waveform;
  switching the first motor vibration input voltage to the second motor vibration input voltage;
  generating a fourth motor vibration waveform based on the second motor vibration input voltage; and
  driving the motor to vibrate according to the fourth motor vibration waveform, wherein the second peak input voltage is a peak voltage of the fourth motor vibration waveform.

* * * * *